Aug. 16, 1932.  H. J. BURNISH  1,872,240
SPACER STRIP FOR ELECTRIC WELDING
Filed July 31, 1929
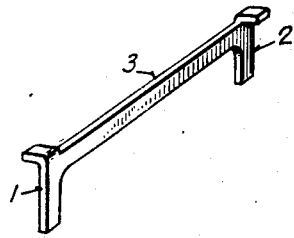
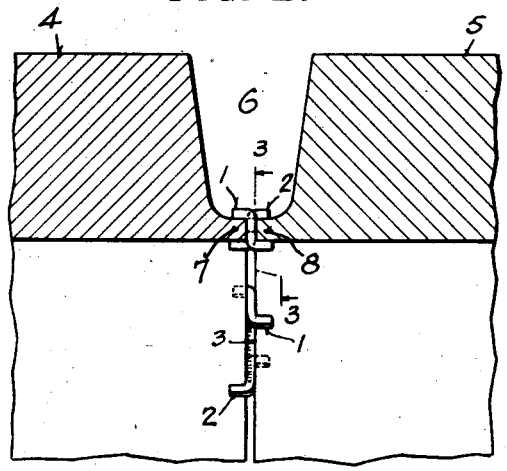
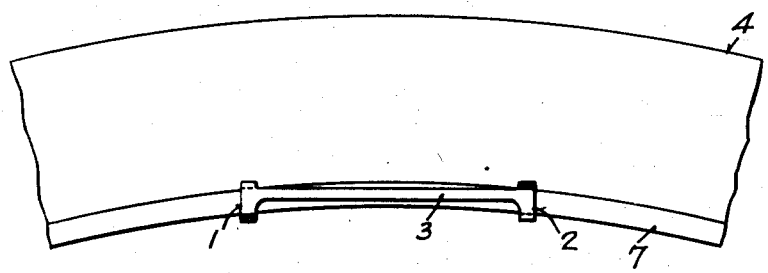
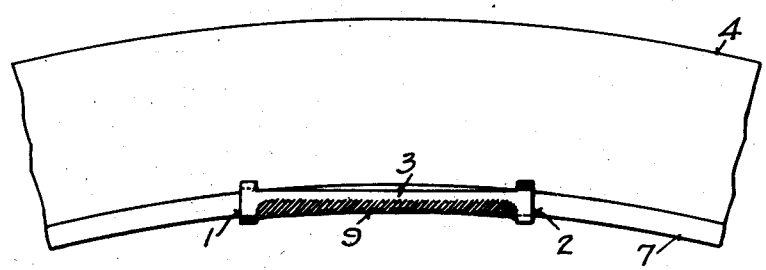
INVENTOR.
Howard J. Burnish
BY
ATTORNEY.

Patented Aug. 16, 1932

1,872,240

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

SPACER STRIP FOR ELECTRIC WELDING

Application filed July 31, 1929. Serial No. 382,418.

This invention relates to a spacer strip for electric welding.

The object of the invention is to provide a strip of metal which is adapted to space the edges to be welded and to hold said edges in alignment.

Another object is to provide a spacer strip of such shape as to form a groove for receiving metal deposited in tack welding prior to the welding of the plate edges together.

Other objects will appear hereinafter.

The invention is illustrated in the accompanying drawing in which:

Figure 1 is a perspective view of the spacer strip.

Fig. 2 is a detailed section showing the application of the spacer strip to the spacing of grooved metal plates to be welded.

Fig. 3 is a section on line 3—3 of Fig. 2.

Fig. 4 is a similar section showing the tack weld.

The spacer strip comprises two clinching members 1 and 2 which are connected by a horizontal longitudinal backing strip 3.

The upper ends of the clinching members 1 and 2 are bent to project laterally from the longitudinal backing strip 3. It is preferred to have these lateral projections extend in opposite directions from the backing strip so as to engage the opposite edges of the plates to be welded.

The spacer strip may be made in a single pressing operation by stamping the same from sheet metal stock of the required thickness and it is preferable to form the lateral projections above referred to simultaneously with the stamping or pressing operation.

The lower ends of the clinching members 1 and 2 extend downwardly from the backing strip 3 and are adapted to be clinched against the plates to be welded as shown in Fig. 2.

The plates 4 and 5 to be welded have their edges chamfered to provide a welding groove 6 and lips 7 and 8 as shown in Fig. 2. The lips 7 and 8 are preferably spaced a predetermined distance for the welding operation and the spacer strip is of such thickness as to exactly space these lips the required amount.

The spacer strip is first inserted in the bottom of the welding groove so that the clinching members extend through between the lips with their lateral projections resting on the top of the lips 7 and 8. The lower ends of the clinching members are then bent by means of a hammer or other suitable tool to clinch upon the lips 7 and 8 and hold the same in alignment. It is preferable to bend the clinching members in opposite directions so that they clinch the opposite lips of the plates being welded, as shown in Fig. 2. The lower ends of the clinching members may be bent in the opposite direction from their respective upper end lateral projections as shown, or they may be bent in the same direction, in which latter case each clinching member would clamp a single edge.

The spacer strip also serves an important function in providing a backing or welding dam for tack welding the plates prior to the main welding operation. A plurality of spacer strips are placed at intervals along the plates and tack welds are made by depositing welding metal 9 in the groove formed between the clinching members 1 and 2 and the lips 7 and 8, the backing strip 3 forming the bottom of the groove. By the use of this spacer strip there is less danger of cutting away or burning away the lips in the tack welding operation and the alignment and spacing of the edges is facilitated.

I claim:

1. A spacer strip for use in welding comprising a body member of predetermined thickness for spacing the articles to be welded and forming a welding dam against which tack welding metal may be deposited, and a plurality of clinching members provided on the body member and extending laterally on both sides thereof for bending across above and below the articles to be welded to support the body member and to hold the articles to be welded in alignment.

2. A spacer strip for use in welding metal articles comprising a body member for spacing the opposed surfaces of the metal articles and providing a welding dam against which tack welding metal may be deposited, and a plurality of clinching members extending laterally from both sides of said body member to positions enabling the ends of said clinching members to be bent upon the metal article above and below for holding the body member and keeping the metal articles in alignment.

3. A spacer strip for use in welding plates comprising a body member of less width than the width of the opposed end surfaces of the plates and providing a welding dam against which tack welding metal may be deposited and a plurality of clinching members extending laterally at spaced intervals from both sides of said body member to positions enabling the ends of the clinching members to be bent in opposite directions above and below the plates for holding the body member in a predetermined position and keeping the metal plates in alignment.

4. A spacer strip for electric arc welding comprising two clinching members having their upper ends bent to project laterally therefrom and means connecting the central portions of said clinching members.

5. A spacer strip for use in electric arc welding comprising a plurality of spaced clinching members and a longitudinal backing strip integral therewith, said backing strip connecting with the clinching members at intermediate points between their clinching ends.

6. A spacer strip for use in electric arc welding of metal plates comprising a plurality of spaced clinching members, each of said members having one end bent laterally thereto, the other ends of said members being straight, said straight ends being adapted to bend into clinching engagement with the edges of the plates to be welded and to cooperate with said bent ends to hold the plates in alignment, and a backing strip connecting the central portions of said clinching members and adapted to lie horizontally in the welding groove and to provide a welding dam against which welding metal may be deposited for welding the edges of the plates together.

In witness whereof I have signed my name at Milwaukee, Wisconsin, this 29th day of July, 1929.

HOWARD J. BURNISH.